No. 886,537. PATENTED MAY 5, 1908.
A. C. McNIVEN.
PORTABLE TRAY OR TRUCK.
APPLICATION FILED JUNE 29, 1907.

WITNESSES: Alexander C. McNiven INVENTOR
By C. A. Snow & Co.
ATTORNEYS

UNITED STATES PATENT OFFICE.

ALEXANDER C. McNIVEN, OF LANGDON, NORTH DAKOTA.

PORTABLE TRAY OR TRUCK.

No. 886,537.  Specification of Letters Patent.  Patented May 5, 1908.

Application filed June 29, 1907. Serial No. 381,474.

*To all whom it may concern:*

Be it known that I, ALEXANDER C. McNIVEN, a citizen of the United States, residing at Langdon, in the county of Cavalier and State of North Dakota, have invented a new and useful Portable Tray or Truck, of which the following is a specification.

This invention relates to portable trucks or trays of that general class especially designed for use in hotels, restaurants, hospitals and similar places and has for its object to provide a comparatively simple and inexpensive deivce of this character for carrying cutlery, dishes and other table articles from the dining room to the kitchen or for transporting the same from one portion of the building to the other.

A further object of the invention is to provide a truck including a frame adapted to receive the dish supporting tray and provided with depending wheels or rollers one of which is pivotally mounted on the frame so that the operator may readily guide the truck when transporting the latter from place to place.

A still further object of the invention is to generally improve this class of devices so as to generally increase their utility, durability and efficiency.

Further objects and advantages will appear in the following description, it being understood that various changes in form, proportions and minor details of construction may be resorted to within the scope of the appended claims.

Figure 1:
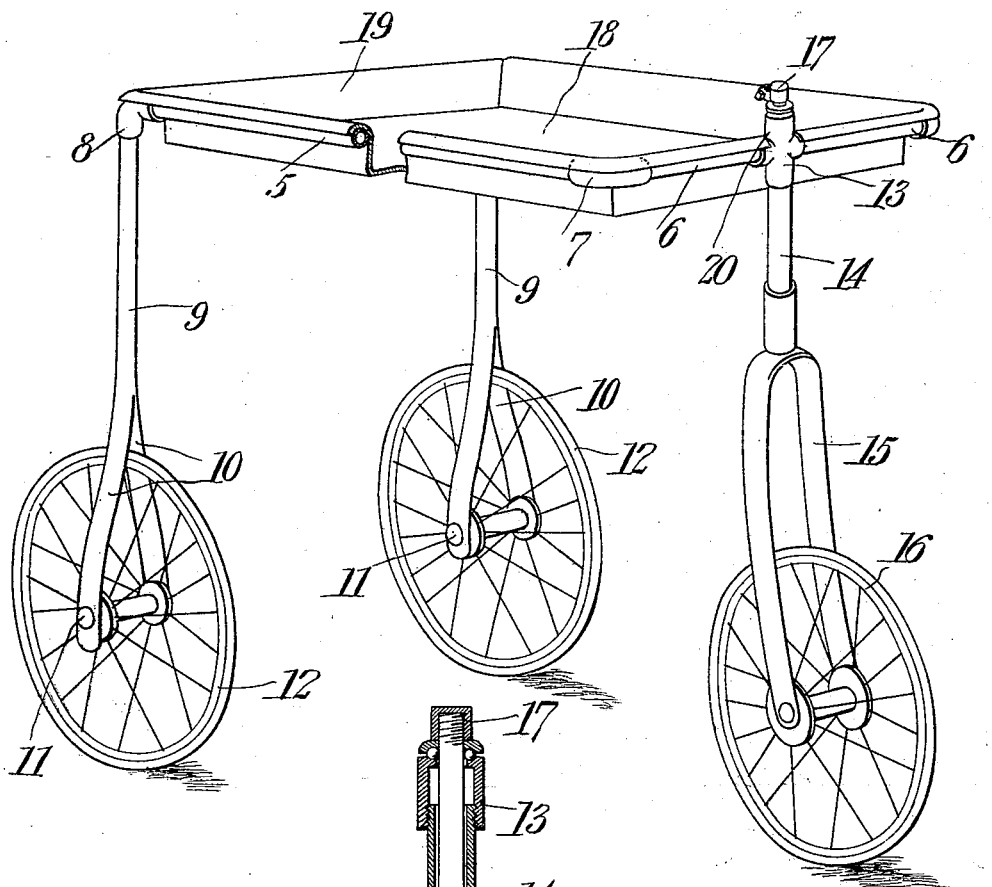
Figure 2:
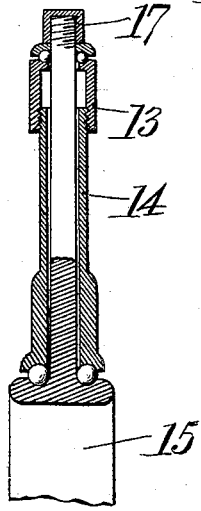

In the accompanying drawings forming a part of this specification: Figure 1 is a perspective view of a portable tray or truck constructed in accordance with my invention. Fig. 2 is a vertical sectional view of the front fork of the truck.

Similar numerals of reference indicate corresponding parts in all of the figures of the drawings.

The improved truck forming the subject matter of the present invention includes a substantially rectangular supporting frame preferably formed of gas pipe and consisting of parallel side members 5 connected to the end members 6 through the medium of corner couplings 7, the latter being threaded for the reception of the correspondingly threaded ends of the side and end members of the frame, as shown.

The rear coupling members are provided with depending collars or extensions 8', the interior walls of which are threaded for connection with supporting legs 9, the latter also being preferably formed of gas pipe and having their lower ends bifurcated to form spaced arms 10 between which are mounted on suitable stub shafts 11 wheels or rollers 12.

The forward end bar or member 6 is provided with an intermediate coupling 13 for connection with the adjacent ends of the member 6, and threaded in said coupling is a relatively short pipe section 14 in which is pivotally mounted the front fork 15 carrying a wheel 16 similar in construction to the rear wheels 12. The fork 15 is provided with a reduced extension which projects vertically through the pipe section 14 and coupling member 13 and is provided with terminal threads for engagement with a retaining cap 17. The lower end of the pipe section 14 is offset to form a race way for the reception of a plurality of antifriction balls while the intermediate coupling 13 is provided with similar race way and antifriction balls thereby to permit free turning movement of the front fork 15 and the adjacent wheel 16 so that the operator may readily guide the truck when transporting the latter from place to place.

Associated with the frame is a removable tray or pan 18 having its peripheral edge curved laterally to form an over-hanging retaining flange 19 adapted to bear against the side and end members 5 and 6 thereby to support the tray in position on the truck.

The pan or tray 18 is formed of metal or other suitable material while the interior walls thereof may be galvanized or covered with porcelain so as to permit the tray to be kept clean as well as to give the same a neat attractive appearance. The forward portion of the flange 19 is cut away at 20 so as to accommodate the intermediate coupling 13, while the corners of the tray are extended laterally over the adjacent corner coupling 7 so that the flange will project a uniform distance around the entire peripheral edge of the supporting frame.

In operation the cutlery, dishes or other table articles are deposited in the tray or receptacle 18 and the latter moved into the kitchen or other portion of the building by exerting a forward pressure on the rear end of the supporting frame, the operator guiding the direction of the truck by exerting a slight lateral pressure on either side of the supporting frame at the rear of the latter.

By adjusting the cap 17 the pivotal movement of the front fork 15 may be regulated so as to prevent the front wheel supporting standard or fork from becoming loose or wabbling.

The wheels 12 and 16 are preferably provided with rubber tires so as to render the truck noiseless.

The trucks may be made in different sizes and shapes and may be japanned, nickeled or otherwise plated to give the same a neat attractive appearance.

From the foregoing description it will be seen that there is provided an extremely simple, inexpensive and efficient device admirably adapted for the attainment of the ends in view.

Having thus described the invention what is claimed is:

1. A portable truck including a frame formed of hollow tubing, tubular supporting legs secured to the rear of the frame and having their lower ends bifurcated, a tubular leg depending from the front end of the frame, a fork having a reduced extension journaled in the front leg, wheels mounted for rotation in the fork and the bifurcated ends of the rear legs, and a tray having a laterally extending flange for engagement with the supporting frame.

2. A portable truck including a frame having tubular side and end members connected by corner couplings, collars depending from the corner couplings at the rear of the frame and having their interior walls threaded, tubular supporting legs engaging the threads on the collar and having their lower ends bifurcated, a tubular front leg carried by the frame, a fork having a reduced extension journaled in the front leg, wheels journaled in the fork and bifurcated ends of the rear legs, respectively, and a tray carried by the frame and provided with a laterally extending flange for engagement with said frame.

3. A portable truck including a substantially rectangular frame including tubular side and end bars connected by corner couplings, collars depending from the corner couplings at the rear of the frame, rear supporting legs threaded in the couplings and having their lower ends bifurcated, a coupling carried by the front bar of the frame, a front leg engaging the coupling, a fork having a reduced extension extending through the front leg and intermediate coupling and having its terminal portion threaded, wheels journaled in the fork and the bifurcated ends of the rear legs, respectively, a cap engaging the threaded end of the extension, and a tray provided with a laterally extending flange for engagement with the supporting frame.

In testimony that I claim the foregoing as my own, I have hereto affixed my signature in the presence of two witnesses.

ALEXANDER C. McNIVEN.

Witnesses:
W. A. McINTYRE,
E. E. FLETCHER.